US012772065B2

(12) United States Patent
Bhatia et al.

(10) Patent No.: US 12,772,065 B2
(45) Date of Patent: Oct. 20, 2026

(54) POLICY BASED CBRS CHANNEL SELECTION IN A CELLULAR COMMUNICATION NETWORK

(71) Applicant: Dell Products L.P., Round Rock, TX (US)

(72) Inventors: Yogesh Bhatia, San Jose, CA (US); Ravi Sharma, Santa Clara, CA (US); Umair Hashmi, Mississauga (CA); Ramy Atawia, Kanata (CA); Jia Liu, Newmarket (CA)

(73) Assignee: DELL PRODUCTS L.P., Round Rock, TX (US)

( * ) Notice: Subject to any disclaimer, the term of this patent is extended or adjusted under 35 U.S.C. 154(b) by 728 days.

(21) Appl. No.: 18/173,908

(22) Filed: Feb. 24, 2023

(65) Prior Publication Data

US 2024/0292229 A1 Aug. 29, 2024

(51) Int. Cl.

| | |
|---|---|
| ***H04W 16/14*** | (2009.01) |
| ***H04W 24/08*** | (2009.01) |
| ***H04W 84/04*** | (2009.01) |

(52) U.S. Cl.

CPC .......... *H04W 16/14* (2013.01); *H04W 24/08* (2013.01); *H04W 84/042* (2013.01)

(58) Field of Classification Search

CPC .... H04W 16/14; H04W 24/08; H04W 84/042
See application file for complete search history.

(56) References Cited

U.S. PATENT DOCUMENTS

| | | | |
|---|---|---|---|
| 10,362,574 | B2 | 7/2019 | Kannan et al. |
| 11,159,950 | B2 | 10/2021 | Cimpu et al. |
| 2017/0055193 | A1 | 2/2017 | Mueck et al. |
| 2019/0115985 | A1 | 4/2019 | Bechta et al. |
| 2019/0342783 | A1 | 11/2019 | Kim et al. |
| 2019/0364565 | A1 | 11/2019 | Hmimy et al. |

(Continued)

FOREIGN PATENT DOCUMENTS

| | | | |
|---|---|---|---|
| CN | 109190379 | A | 1/2019 |
| CN | 111989585 | A | 11/2020 |

(Continued)

OTHER PUBLICATIONS

Spectrum Sharing Committee "CBRS Incumbent Protections and Encumbrances Overview—Document WINNF-TR-5003, Version V1.0.0" Wireless Innovation Forum, Apr. 28, 2020, 67 pages.

(Continued)

*Primary Examiner* — Joseph A Bednash
(74) *Attorney, Agent, or Firm* — Amin, Turocy & Watson, LLP

(57) ABSTRACT

The described technology is generally directed towards policy-based citizens broadband radio service (CBRS) channel selection in a cellular communication network. A selection policy can be applied to select CBRS channels for radio access network (RAN) nodes. The selection policy can (Continued)

include performance indicator thresholds, and a CBRS channel can be selected for use at a RAN node when performance indicator measurement values for the CBRS channel satisfy the performance indicator thresholds. The selection policy can be dynamic by applying different performance indicator thresholds under different circumstances such as different traffic conditions experienced at the RAN node.

20 Claims, 12 Drawing Sheets

(56) References Cited

U.S. PATENT DOCUMENTS

| | | | | |
|---|---|---|---|---|
| 2020/0045615 | A1* | 2/2020 | Karimli | H04W 48/08 |
| 2020/0059405 | A1* | 2/2020 | Liu | H04L 41/0816 |
| 2020/0162929 | A1 | 5/2020 | Cimpu et al. | |
| 2020/0213862 | A1* | 7/2020 | Sevindik | H04W 72/541 |
| 2021/0337620 | A1 | 10/2021 | Zhu et al. | |
| 2022/0400502 | A1 | 12/2022 | Maeder et al. | |
| 2022/0417761 | A1 | 12/2022 | Khawer et al. | |
| 2023/0232450 | A1* | 7/2023 | Yang | H04W 72/50<br>370/329 |
| 2023/0262715 | A1 | 8/2023 | Sevindik | |
| 2024/0032005 | A1 | 1/2024 | Srivastava | |
| 2024/0114352 | A1 | 4/2024 | Bandyopadhyay et al. | |
| 2025/0254010 | A1 | 8/2025 | Lin et al. | |

FOREIGN PATENT DOCUMENTS

| | | | |
|---|---|---|---|
| EP | 3 319 358 | A1 | 5/2018 |
| WO | 2016/033049 | A1 | 3/2016 |
| WO | 2022/011206 | A1 | 1/2022 |

OTHER PUBLICATIONS

Notification Concerning Transmittal of International Preliminary Report on Patentability received for PCT Application Serial No. PCT/US2023/035963 dated Sep. 4, 2025, 15 pages.

International Search Report and Written Opinion received for PCT Application Serial No. PCT/US2023/035963 dated Apr. 9, 2024, 25 pages.

Qaio et al., "Dynamic Frequency Selection Based on Minimum Interference and Minimum Occupation Time in Licensed-assisted Access", Proceedings of International Conference on Communication Technology, IEEE, 2015, pp. 827-832.

So et al., "Voice/data Transmission in Common Packet Channel of 3GPP", XP-000988630, Department of Electrical Engineering & Computer Science, IEEE, 2000, pp. 1473-1477.

Voicu et al., "Survey of Spectrum Sharing for Inter-Technology Coexistence", arxiv:1712.08589v2, Jun. 4, 2018, 31 pages.

Notification Concerning Transmittal of International Preliminary Report on Patentability received for PCT Application Serial No. PCT/US2023/035966 dated Sep. 11, 2025, 6 pages.

European Office Action mailed Oct. 8, 2025 for European Patent Application No. 23806114.7, 3 pages.

Office Action mailed Oct. 1, 2025 for U.S. Appl. No. 18/175,174, 38 pages.

International Search Report and Written Opinion received for PCT Application Serial No. PCT/US2023/035966 dated Feb. 9, 2024, 13 pages.

ETSI Draft Specification "Reconfigurable Radio Systems; Feasibility Study on Existing Spectrum Sharing Frameworks for Temporary and Flexible Spectrum Access", European Telecommunications Standards Institute, vol. 08, Jan. 13, 2023, 47 pages.

Final Office Action received for U.S. Appl. No. 18/175,174 dated Mar. 12, 2026, 23 pages.

Notice of Allowance received for U.S. Appl. No. 18/175,174 dated May 28, 2026, 6 pages.

* cited by examiner

POLICY BASED CBRS CHANNEL SELECTION IN A CELLULAR COMMUNICATION NETWORK

BACKGROUND

The citizens broadband radio service (CBRS) refers to radio communication frequencies in the 3550 megahertz (MHz) to 3700 MHz range. The United States Federal Communications Commission (FCC) has designated the CBRS frequency range for sharing among different users, including “incumbent” users, “priority access license (PAL)” users and “general authorized access (GAA)” users.

Incumbent users generally include the United States Navy as well as commercial fixed satellite stations. PAL users generally include users that purchase spectrum licenses at a CBRS PALs auction. GAA users are unlicensed users that can use the CBRS frequencies for free, subject to a requirement that GAA users avoid interference with incumbent users and PAL users.

A spectrum access system (SAS) helps users avoid interfering uses of CBRS frequencies. When a user wants to use a CBRS band in a geographic location, the user submits a request to the SAS. If the CBRS band is available in the geographic location, the SAS will grant the request.

Wireless service providers can use CBRS to enhance their networks. To use CBRS, wireless service providers can configure their radio access network (RAN) nodes to request usage of CBRS bands from the SAS. A RAN node can assess the performance of different available CBRS bands and can request use of a most suitable CBRS band. The granted CBRS band can be used by the RAN node until revoked by the SAS.

During the time that a RAN node uses a CBRS band, the quality of CBRS band transmissions can vary, and RAN node requirements can also vary. Such variance can pose challenges for CBRS band selection at RAN nodes, because a selected CBRS band may not always satisfy use-case specific quality of service (QOS) requirements, such as service level agreements, packet delay budgets, and minimum bitrates.

The above-described background is merely intended to provide a contextual overview of some current issues and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
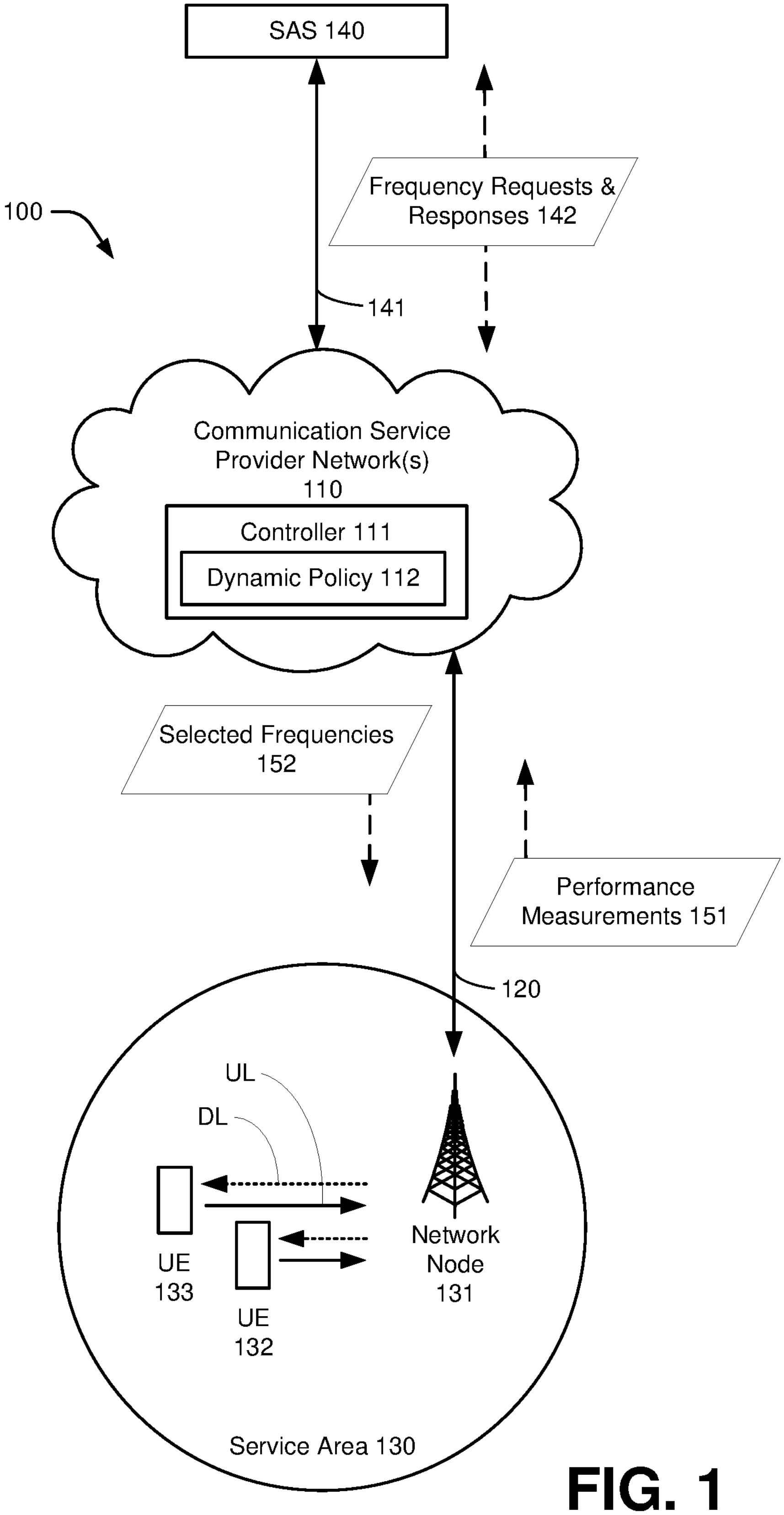
FIG. 1 illustrates an example cellular communication network adapted for policy based CBRS channel selection, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The subject application generally relates to policy based CBRS channel selection in a cellular communication network. Example embodiments are directed towards the application of a selection policy to select CBRS channels for RAN nodes. The selection policy can include performance indicator thresholds, and a CBRS channel can be selected for use at a RAN node when performance indicator measurement values for the CBRS channel satisfy the performance indicator thresholds. The selection policy can optionally be dynamic by applying different performance indicator thresholds under different circumstances, e.g. under different traffic conditions experienced at the RAN node. Further aspects and embodiments are described in detail below.

FIG. 1 illustrates an example cellular communication network adapted for policy based CBRS channel selection, in accordance with one or more embodiments described herein. FIG. 1 includes a wireless communication system 100 comprising communication service provider network(s) 110, a network node 131, and user equipment (UEs) 132, 133. The communication service provider network(s) 110 can include a controller 111 equipped with a dynamic policy 112. The communication service provider network(s) 110 can be adapted to communicate with a spectrum access system (SAS) 140. General features of the communication system 100 will be described below, followed by a description of features and operations involved in policy based CBRS channel selection.

In FIG. 1, a backhaul link 120 connects the communication service provider network(s) 110 and the network node 131. The network node 131 can communicate with UEs 132, 133 within its service area 130. The dashed arrow lines from the network node 131 to the UEs 132, 133 represent downlink (DL) communications to the UEs 132, 133. The solid arrow lines from the UEs 132, 133 to the network node 131 represent uplink (UL) communications.

In general, with reference to FIG. 1, the non-limiting term "user equipment" can refer to any type of device that can communicate with network node 131 in a cellular or mobile communication system 100. UEs 132, 133 can have one or more antenna panels having vertical and horizontal elements. Examples of UEs 132, 133 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 132, 133 can also comprise IOT devices that communicate wirelessly.

In various embodiments, system 100 comprises communication service provider network(s) 110 serviced by one or more wireless communication network providers. Communication service provider network(s) 110 can comprise a "core network". In example embodiments, UEs 132, 133 can be communicatively coupled to the communication service provider network(s) 110 via a network node 131. The communication service provider network(s) 110, e.g., the controller 111, can provide settings, parameters, and other control information to the network node 131, which can configure the network node 131 communications with the UEs 132, 133. In some embodiments, the controller 111 can comprise a RAN intelligent controller (RIC), which can be adapted to perform the functions described herein.

The network node 131 can communicate with UEs 132, 133, thus providing connectivity between the UEs 132, 133 and the wider cellular network. The UEs 132, 133 can send transmission type recommendation data to the network node 131. The transmission type recommendation data can comprise a recommendation to transmit data via a closed loop multiple input multiple output (MIMO) mode and/or a rank-1 precoder mode.

Network node 131 can have a cabinet and other protected enclosures, computing devices, an antenna mast, and multiple antennas for performing various transmission operations (e.g., MIMO operations) and for directing/steering signal beams. Network node 131 can comprise one or more base station devices which implement features of the network node. Network nodes can serve several cells, depending on the configuration and type of antenna. In example embodiments, UEs 132, 133 can send and/or receive communication data via wireless links to the network node 131.

Communication service provider networks 110 can facilitate providing wireless communication services to UEs 132, 133 via the network node 131 and/or various additional network devices (not shown) included in the one or more communication service provider networks 110. The one or more communication service provider networks 110 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 110 can be or comprise the wireless communication network and/or various additional devices and components of the wireless communication network (e.g., additional network devices and cell, additional UEs, network server devices, etc.).

The network node 131 can be connected to the one or more communication service provider networks 110 via one or more backhaul links 120. The one or more backhaul links 120 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 120 can also comprise wireless link components, such as but not limited to, line-of-sight (LOS) or non-LOS links which can comprise terrestrial air-interfaces or deep space links (e.g., satellite communication links for navigation). Backhaul links 120 can be implemented via a "transport network" in some embodiments. In another embodiment, network node 131 can be part of an integrated access and backhaul network. This may allow easier deployment of a dense network of self-backhauled 5G cells in a more integrated manner by building upon many of the control and data channels/procedures defined for providing access to UEs 132, 133.

Wireless communication system 100 can employ various cellular systems, technologies, and modulation modes to facilitate wireless radio communications between devices (e.g., the UEs 132, 133 and the network node 131). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 132, 133 and the network node 131) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mm Wave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mm Wave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

A wireless communication system 100 such as illustrated in FIG. 1 can be configured to conduct policy based CBRS channel selection. In general, the network node 131 can be configured to provide performance measurements 151 to the communication service provider network(s) 110. The performance measurements 151 can comprise measurements performed by the network node 131 or the UEs 132, 133 on different CBRS channels. This disclosure is not limited to any specific performance measurement type, however interference received signal strength indicator (interference RSSI) measurements are used herein as example performance measurements.

The controller 111 can be adapted to apply the dynamic policy 112 to the performance measurements 151, in order to select a CBRS channel for use in connection with communications between the network node 131 and the UEs 132, 133. For example, applying the dynamic policy 112 may comprise comparing different performance measurements 151 with a performance threshold defined by the dynamic policy 112. CBRS channels associated with performance measurements 151 that fall outside the performance threshold (e.g., by exceeding the performance threshold or otherwise not meeting the performance threshold) can be avoided (not selected for use) while CBRS channels associated with performance measurements 151 that satisfy the performance threshold of the dynamic policy 112 can be selected by the controller 111 for use by the network node 131.

In addition to identifying CBRS channels associated with performance measurements 151 that satisfy the performance threshold(s) of the dynamic policy 112, the controller 111 can be adapted to communicate with the SAS 140 via communication link 141, to determine available CBRS channels that are available for use by the network node 131 and UEs 132, 133. The controller 111 can be adapted to exchange frequency requests and responses 142 with the SAS 140. For example, the controller 111 can be adapted to request from the SAS 140 a list of available CBRS channels, which are available for use in the service area 130, and the controller 111 can receive from the SAS 140 a returned list of available CBRS channels. The controller 111 can be adapted to compare the returned list of available CBRS channels with the controller's 111 list of CBRS channels associated with performance measurements 151 that satisfy the performance threshold of the dynamic policy 112. The controller 111 can be adapted to select a CBRS frequency or frequencies that are both available, as determined by the returned list from the SAS 140, and are also associated with performance measurements 151 that satisfy the performance threshold of the dynamic policy 112.

After channel/frequency selection by the controller 111, the controller can be adapted to send the selected frequency/frequencies 152 to the network node 131, to thereby configure the network node 131 to use the selected frequency/frequencies 152 in connection with communications with UEs 132, 133. In some embodiments, the controller 111 can instruct the network node 131 to use a selected CBRS frequency while in other embodiments, the network node 131 can send a set of CBRS frequencies to the network node 131 and the network node can be configured to use any CBRS frequencies of the set of CBRS frequencies. The network node 131 can continue to send additional performance measurements 151 to the controller 111, and performance measurements 151 associated with different CBRS channels can change over time. The controller 111 can be configured to repeat the operations described herein to re-apply the dynamic policy 112 as needed to re-select a CBRS frequency for use by the network node 131.

In some embodiments, the controller 111 can be configured to modify the dynamic policy 112 and/or switch the dynamic policy 112 to a different policy. For example, the controller 111 can be configured to change the dynamic policy 112 in response to different prevailing network traffic conditions at network node 131. When the prevailing traffic conditions exhibit a first threshold level of ultra-reliable low latency communications (URLLC), a first dynamic policy can be applied, and when the prevailing traffic conditions exhibit a second threshold level of URLLC, a second dynamic policy can be applied. A feature of the architecture described herein is high flexibility to use sophisticated CBRM channel selection policies as well as dynamic policies for CBRS channel selection.

The architecture illustrated in FIG. 1 differs from systems in which the SAS 140 grants CBRS channels in response to requests originated at the network node 131. While network node 131 can be adapted to assess the performance of different CBRS channels and request the ones that are most suitable, the granted channels will be used by the network node 131 for long time periods, until revoked by the SAS 140. Meanwhile, UE 132, 133 mobility and random behavior of a wireless channel can result in a time-varying channel response for a granted CBRS channel. Such dynamics pose challenges in channel selection implemented by RAN vendors, which do not satisfy the deployment and use-case specific quality of service (QoS) requirements for each operator. Thus, systems in which the SAS 140 grants CBRS channels in response to requests originated at the network node 131 can result in violations of service level agreements (SLA) such as packet delay budgets and minimum bitrates.

In contrast, the architecture illustrated in FIG. 1 can employ, at the controller 111, a dynamic QoS-based policy 112 for CBRS channel selection that can satisfy defined delay and throughput requirements for different services such as URLLC and enhanced mobile broadband (eMBB). The dynamic policy 112 can comprise, e.g., a QoS-based policy. Techniques disclosed herein allow the operator of the cellular communication network(s) 110 to define a dynamic policy 112 with customized key performance indicators (KPIs) such as interference RSSI statistical parameters (e.g., average, max, or x percentile) or a time duration parameter that specifies a length of time during which the RSSI remains above a threshold. Performance measurements 151 that fail to satisfy the dynamic policy 112 can reflect a service outage due to throughput falling below a minimum value defined in a QoS profile. The dynamic policy 112 can furthermore contain thresholds to filter channels associated with corresponding operator defined KPIs that do not meet a target QoS. In addition, the dynamic policy 112 can include different weights for each operator defined KPI, reflecting the impact of each KPI on the degree of QoS satisfaction.

The dynamic policy 112 can be updatable. For example, KPI thresholds and weights in the dynamic policy 112 can be adapted autonomously by the controller 111 during runtime based on measured QoS KPIs (e.g., latency), 5G QoS identifier (5QI) configuration profiles, and UE 132, 133 measurement reports. The dynamic policy 112 can be updated in order to capture variations in user traffic type, e.g., when most of the traffic is URLLC, the dynamic policy 112 can favor channels with shorter outages even if the spectral efficiency is low. By allowing dynamic policy 112 updates, embodiments can improve upon techniques that rely on a static sorted list of channels which are optimal for only single traffic type deployments.

Embodiments can optionally be open RAN (O-RAN) compliant. For example, the dynamic policy 112 can be implemented in a non-real time RAN intelligent controller (RIC) rApp. Data can be collected from RAN nodes over O1 or A1 interfaces, and channel recommendations can be provided to the operator via a service management and orchestration component (SMO, e.g., over an R1 interface.

Embodiments described herein can use an operator defined QoS policy for CBRS channel selection. CBRS channels used by the network node 131 can be dynamically updated based on RAN performance measurements 151. Policy updates and channel selection decisions can be either threshold based or machine learning (ML) based to cope with channel dynamics.

Figure 2:
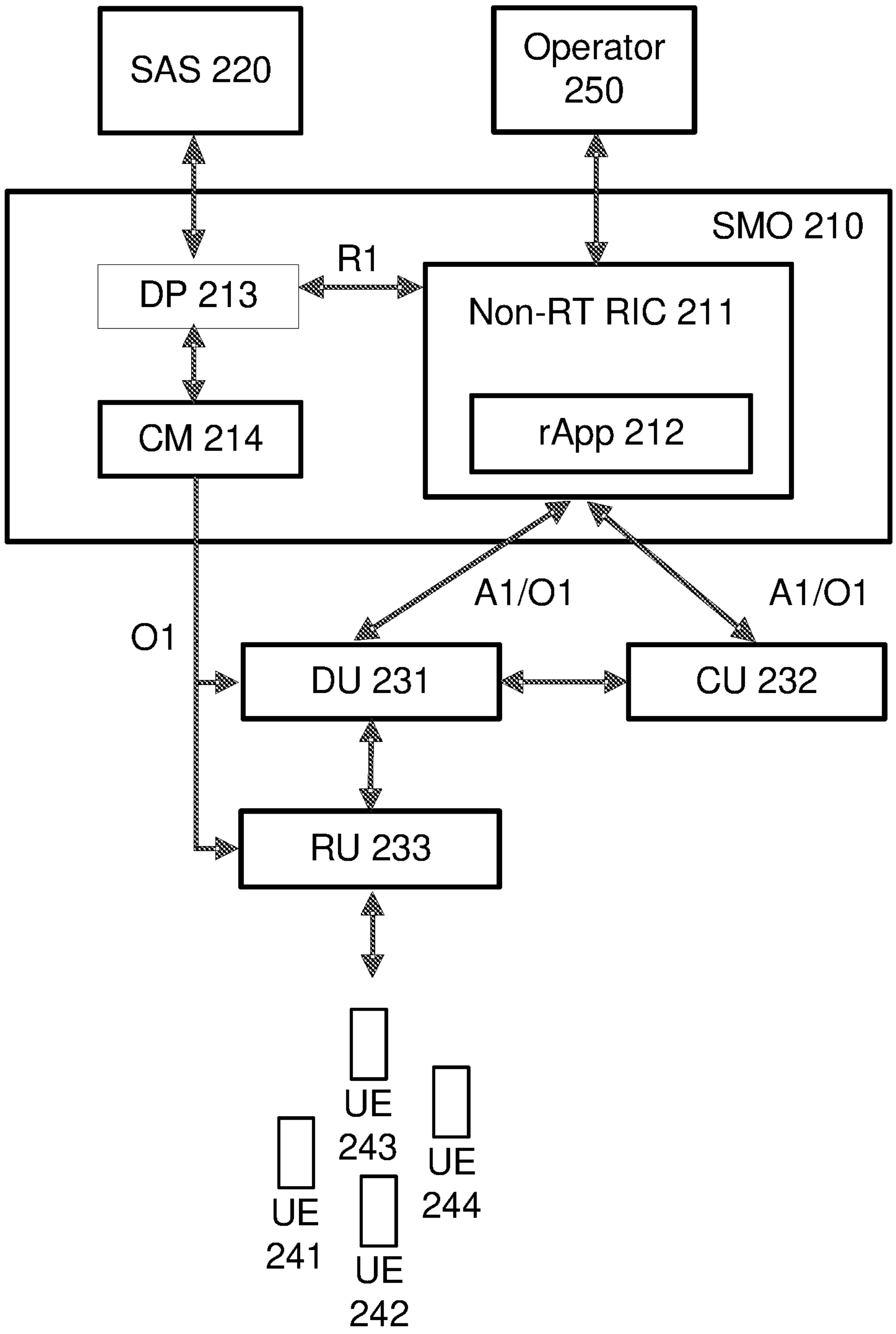
FIG. 2 illustrates an example cellular communication network system architecture, in accordance with one or more embodiments described herein.

FIG. 2 illustrates an example cellular communication network system architecture, in accordance with one or more embodiments described herein. FIG. 2 includes a SMO 210, a SAS 220, an operator 250, a distributed unit (DU) 231, a central unit (CU) 232, a radio unit (RU) 233, and UEs 241, 241, 243, and 244. The SMO 210 comprises a non-real time RIC (non-RT RIC) 211 which includes an example rApp 212. The SMO 210 further comprises a domain proxy (DP) 213 and a configuration management module (CM) 214. The non-RT RIC 211 is coupled with the DU 231 and the CU 232 via an A1/O1 interface, and the non-RT RIC 211 is coupled with the DP 213 via an R1 interface. The CM 214 is coupled with the DU 231 and the RU 233 via an O1 interface.

The architecture illustrated in FIG. 2 can implement the cellular communication system 100 introduced in FIG. 1, in some embodiments. The SMO 210 can implement a portion of the communication service provider network(s) 110 of FIG. 1, the DU 231, CU 232, and RU 233 can implement the network node 131 of FIG. 1, the SAS 220 can implement the SAS 141 of FIG. 1, and the UEs 241-244 can implement the UEs 132, 133 of FIG. 1.

In an example embodiment, the architecture illustrated in FIG. 2 can comprise an O-RAN compliant architecture. The SMO 210 can host the non-RT RIC 211 and the DP 213. The non-RT RIC 211 can host the rApp 212, which can provide a microservice that evaluates possible CBRS channels according to the operator 250 defined QoS policies. The non-RT RIC 211 can collect QOS KPIs from the CU 232, as well as RU 233 channel measurements forwarded from the DU 231 using the O1 and A1 and front-haul interfaces.

The DP 213 can be configured to receive CBRS channel recommendations from the rApp 212 via the R1 interface. The DP 213 can also be configured to receive available CBRS channels and DBRS channel grants from the SAS 220. The DP 213 can be configured to select a CBRS channel or channels based on the received information and forward the selected channel(s) to the RU 233 via the CM 214.

The RU 233 can be configured as a citizens' broadband radio service device (CBSD), which also performs CBRS channel measurements used for QoS-based channel evaluation by the rApp 212. The RU 233 can be configured to use a CBRS channel configuration determined at the DP 213 and communicated via the CM 214 and the O1 interface. The RU 233 provides wireless service to UEs 241-244, and the RU may apply different traffic types in its communications with UEs 241-244, such as URLLC and eMBB.

Figure 3:
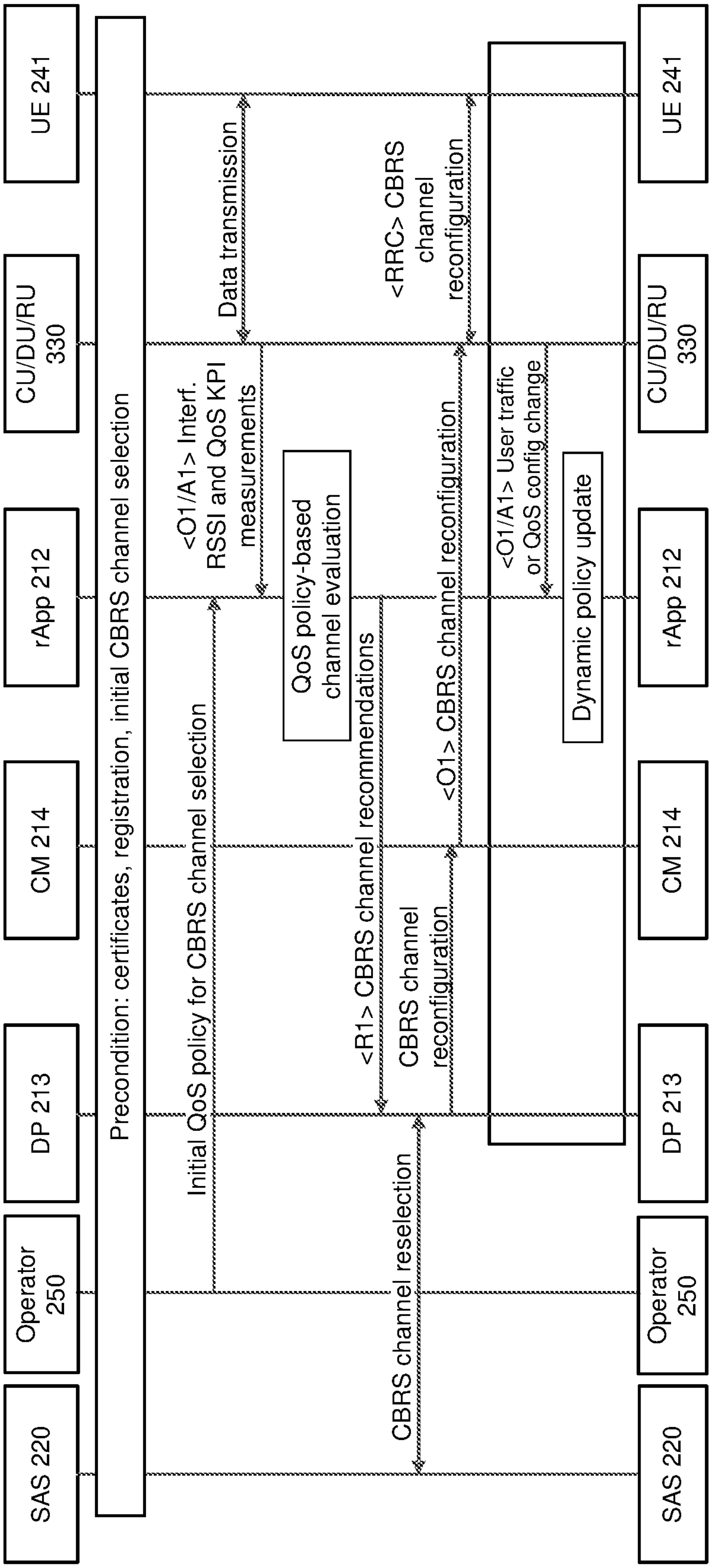
FIG. 3 is a signaling diagram that illustrates example interactions between the components of the system architecture introduced in FIG. 2, in accordance with one or more embodiments described herein.

FIG. 3 is a signaling diagram that illustrates example interactions between the components of the system architecture introduced in FIG. 2, in accordance with one or more embodiments described herein. FIG. 3 includes the components previously introduced in FIG. 2, namely the SAS 220, the operator 250, the DP 213, the CM 214, the rApp 212, the CU/RU/DU (referred to collectively in FIG. 3 as 330), and an example UE 241.

As a precondition for the illustrated interactions, the various components have exchanged the applicable certificates and registrations to engage in secure communications, and an initial CBRS channel selection has occurred and can be used for communications between the CU/RU/DU 330 and the UE 241. The operator 250 can configure and provide an initial QoS policy for CBRS channel selection to the rApp 212. The UE 241 can engage in data transmissions with the CU/RU/DU 330, and the performance of the data transmissions can be measured either at the UE 241 or at the CU/RU/DU 330. For example, interference RSSI and other QOS KPI measurements can be made. These performance measurements can be forwarded by the CU/RU/DU 330 to the rApp 212 via the O1/A1 interfaces.

The rApp 212 can be configured to perform a QoS policy-based channel evaluation, by applying the QoS policy supplied by the operator 250 to the CBRS channel performance measurements received from the CU/RU/DU 330. The rApp 212 can determine resulting CBRS channel recommendations, i.e. channel recommended for use by the CU/RU/DU 330, and the rApp 212 can forward the CBRS channel recommendations to the DP 213 via the R1 interface.

The DP 213 can be configured to use the received CBRS channel recommendations in connection with a CBRS channel reselection, in which the DP 213 communicates with the SAS 220 to identify and reserve an available CBRS channel. The DP 213 can prioritize channels that are among the CBRS channel recommendations when reserving a CBRS channel for use by the CU/RU/DU 330.

After reserving a CBRS channel, the DP 213 can provide CBRS channel reconfiguration information to the CM 214. The CM 214 can in turn supply the CBRS channel reconfiguration information to the CU/RU/DU 330. The CBRS channel reconfiguration information can identify a newly selected CBRS channel for use by the CU/RU/DU 330. The CU/RU/DU 330 can perform a radio resource control (RRC) transmission to the UE 241, to inform the UE of the CBRS channel reconfiguration information. The UE 241 can use the newly selected CBRS channel identified by the CBRS channel reconfiguration information in its communications with the CU/RU/DU 330.

The CU/RU/DU 330 can supply the rApp 212 with user traffic statistics and/or QoS configuration changes, and the rApp 212 can assess whether the received information warrants a dynamic policy update of the QoS policy received from the operator 250. If the rApp 212 initiates a new policy, then the rApp 212 can return for example to the QoS policy-based channel evaluation to initiate CBRS channel reselection.

Figure 4:
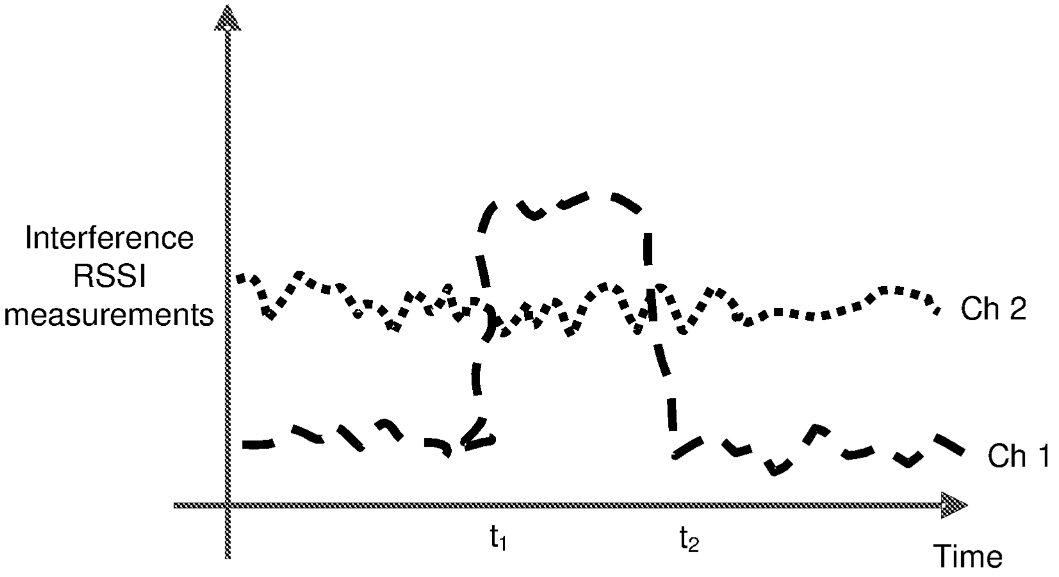
FIG. 4 is a graph showing example interference received signal strength indicator (RSSI) measurements for two different channels over time, in accordance with one or more embodiments described herein.

FIG. 4 is a graph showing example interference received signal strength indicator (RSSI) measurements for two different channels over time, in accordance with one or more embodiments described herein. In FIG. 4, channel 1 exhibits overall lower interference RSSI measurements than channel 2, however, channel 1 also exhibits a spike in interference RSSI measurements. During the spike, channel 1 exhibits higher interference RSSI measurements than channel 2.

Solutions according to this disclosure can implement an "average RSSI" channel KPI. An example dynamic policy 112 can be configured to typically select channel 1, due to its lower time-averaged interference RSSI measurements. However, channel 1 experienced an interference burst between t1 and t2 and during that interval, channel 1 can be deemed not suitable for URLLC traffic pursuant to dynamic policy 112. Embodiments of this disclosure allow the operator 250 to define a more sophisticated dynamic policy 112 that can include rules such as the maximum interference RSSI in order to avoid selecting channel 1, thus favoring channel 2 with no outages despite channel 2's higher average RSSI interference measurements.

Figure 5:
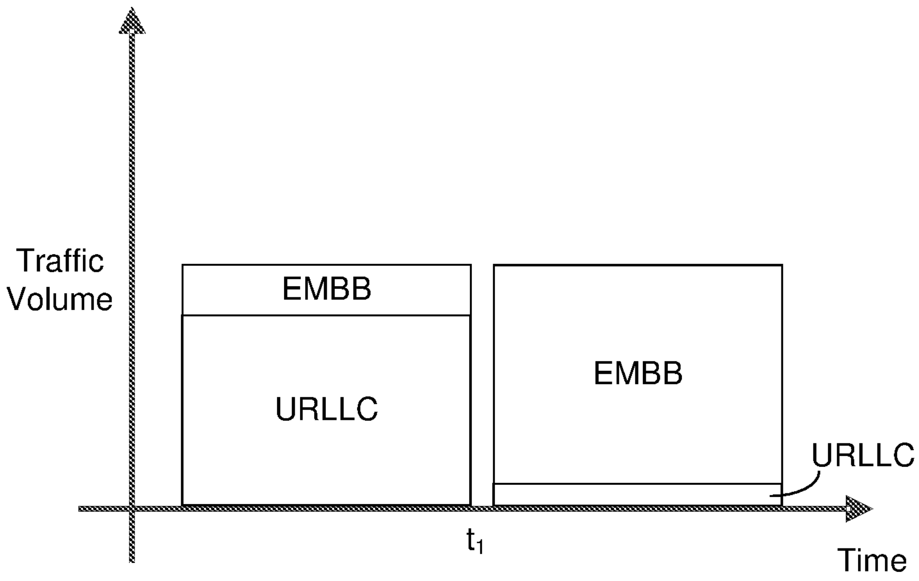
FIG. 5 is a graph showing example variation of network traffic types over time, in accordance with one or more embodiments described herein.

FIG. 5 is a graph showing example variation of network traffic types over time, in accordance with one or more embodiments described herein. In FIG. 5, initially, traffic processed by a network node 131 can comprise mostly URLLC traffic, with a relatively small amount of eMBB traffic. However, after time t1, the traffic balance changes, and a majority of traffic is eMBB traffic with a relatively small amount of URLLC traffic. Embodiments of this disclosure can detect changes in traffic balance and can apply a modified CBRS channel selection policy in response to such changes. The modified CBRS channel selection policy can result in CBRS channel recommendation changes over time based on the presence of (or proportion of) URLLC traffic. Before t1, an example dynamic policy 112 can select channel 2 from FIG. 4, because URLLC traffic cannot afford the temporal outages of channel 1. After t1, when the URLLC disconnects and primarily or only eMBB traffic is served, the traffic is less delay sensitive and so, for example, a selection policy can operate to select channel 1 from FIG. 4 due to its higher spectral efficiency (time-averaged lower interference RSSI).

Figure 6:
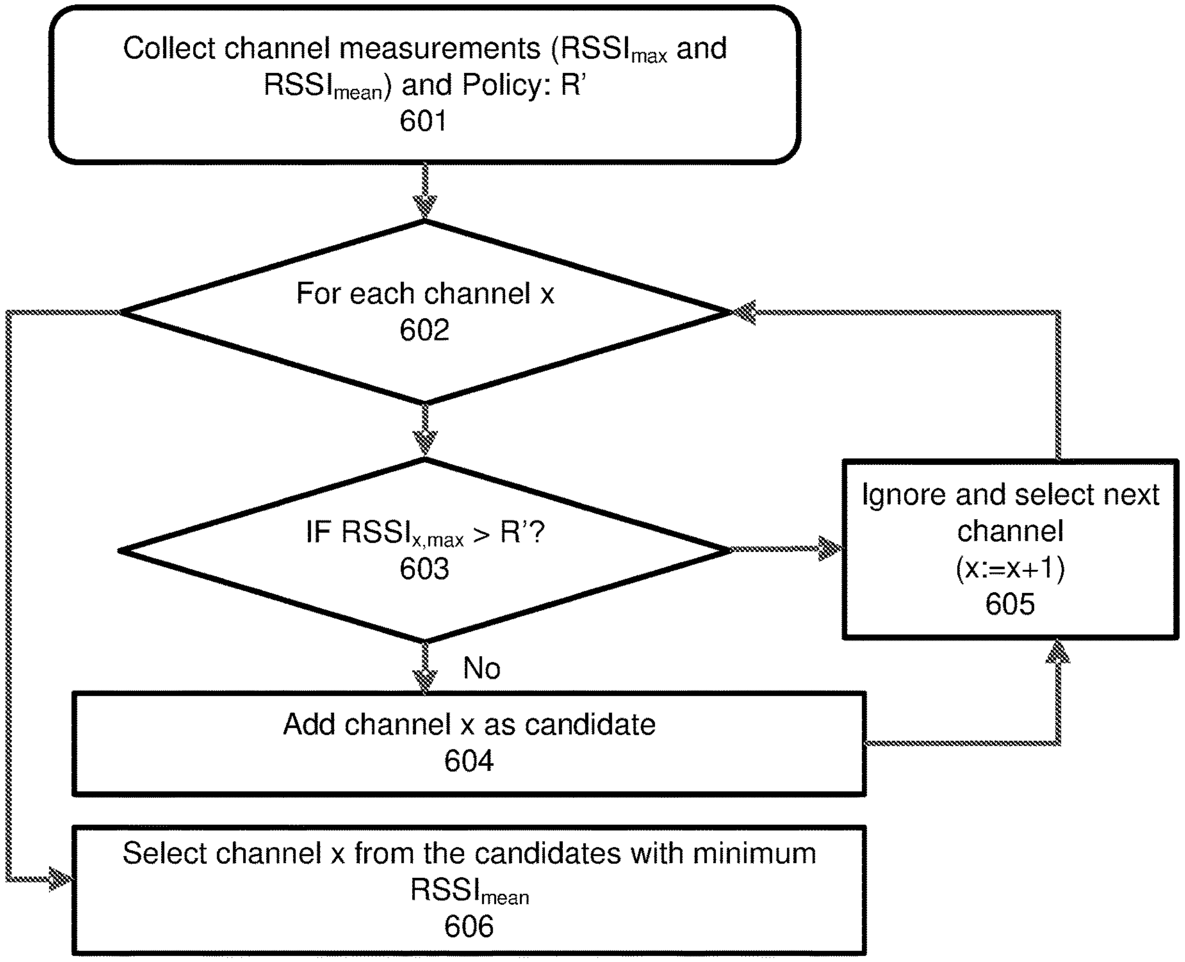
FIG. 6 illustrates an example process for policy-based channel selection, in accordance with one or more embodiments described herein.

FIG. 6 illustrates an example process for policy-based channel selection, in accordance with one or more embodiments described herein. The operations illustrated in FIG. 6 can be performed, for example, by a controller 111 equipped with a dynamic policy 112, as illustrated in FIG. 1. In embodiments according to FIG. 6, some CBRS channels can be excluded from further evaluation if a maximum measured interference RSSI ($RSSI_{max}$) passes a maximum tolerable value (R') indicated in the dynamic policy 112. Further evaluation can include criteria such as average RSSI ($RSSI_{mean}$).

At 601, the controller 111 can collect channel measurements $RSSI_{max}$ and $RSSI_{mean}$ for evaluation against the policy threshold R'. At 602, evaluation of an individual channel x can be initiated. At 603, a determination can be made regarding whether the $RSSI_{x,max}$ for the channel x is greater than the threshold R'. If yes, then at 605 the channel x can be ignored, and a next channel is evaluated by return to 602. If no, then at 604 the channel x can be added as a candidate for CBRS channel selection. After 604, a next channel is evaluated by return to 602. After all the channels are evaluated, at 606, a channel with the lowest (minimum) $RSSI_{mean}$ can be selected from the channels that do not violate the threshold R'. Alternatively, the candidate channels can be ranked or prioritized by $RSSI_{mean}$, with lower $RSSI_{mean}$ values resulting in higher ranking/priority. A CBRS channel with the highest ranking/priority can be selected for use in connection with network node 131 transmissions.

Figure 7:
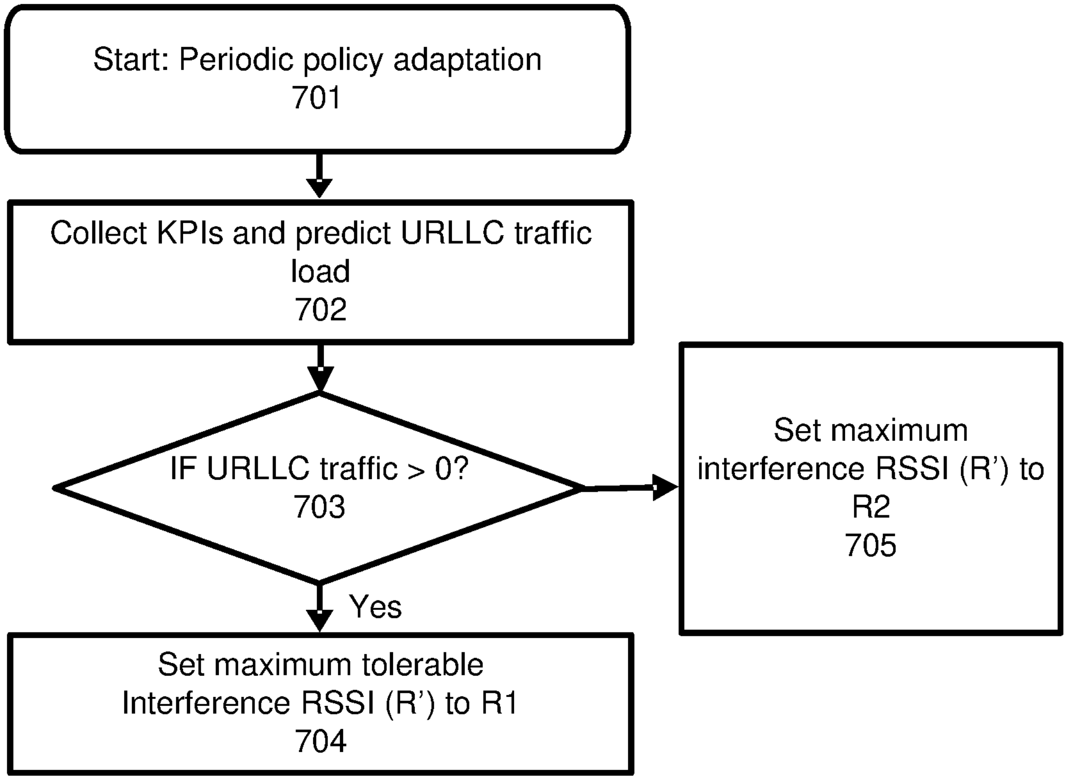
FIG. 7 illustrates an example process for implementing dynamic policy changes, in accordance with one or more embodiments described herein.

FIG. 7 illustrates an example process for implementing dynamic policy changes, in accordance with one or more embodiments described herein. The operations illustrated in FIG. 7 can be performed, for example, by a controller 111 equipped with a dynamic policy 112, as illustrated in FIG. 1. In embodiments according to FIG. 7, a minimum threshold RSSI (R') used for channel selection is adapted based on type of traffic (e.g., URLLC). FIG. 7 uses two example interference RSSI values, R1 and R2, where R1>R2. The process illustrated in FIG. 7 can be used to adapt a dynamic policy 112 to meet stringent requirements of URLLC, for example by selecting a higher threshold (R'=R1) in an interval when URLLC traffic is expected.

At 701, the process can begin for example as a scheduled periodic policy adaptation. At 702, the process can collect KPIs (performance measurements 151 from the network node 131) and predict URLLC traffic load at the network node 131. At 703, the process can determine if URLLC traffic is greater than zero. Alternatively, the process can determine if URLLC traffic is greater than a predetermined threshold proportion of overall traffic, or if URLLC traffic is greater than any predetermined traffic quantity. If yes at 703, then the process can adapt a dynamic policy 112, e.g., by setting a maximum tolerable (threshold) interference RSSI to R1. If no at 703, then the process can adapt the dynamic policy 112, e.g., by setting a maximum tolerable (threshold) interference RSSI to R2.

Figure 8:
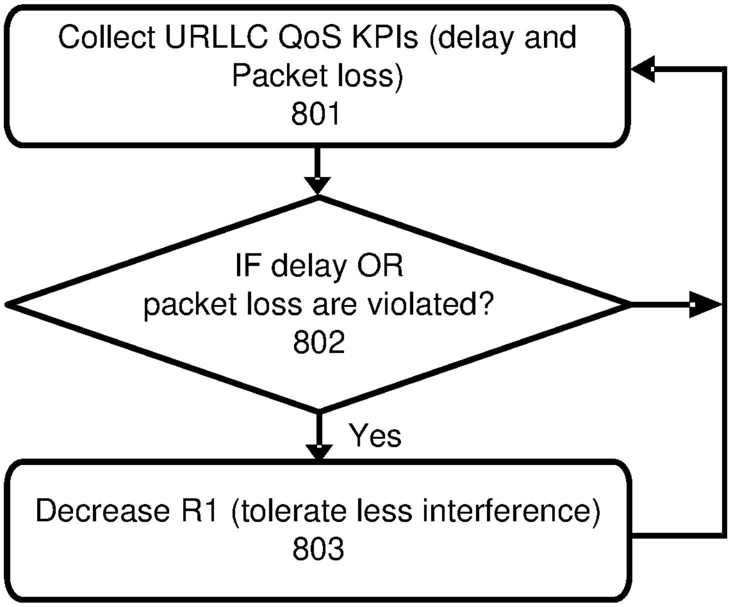
FIG. 8 illustrates an example process for implementing real time policy adaptations, in accordance with one or more embodiments described herein.

FIG. 8 illustrates an example process for implementing real time policy adaptations, in accordance with one or more embodiments described herein. The operations illustrated in FIG. 8 can be performed, for example, by a controller 111 equipped with a dynamic policy 112, as illustrated in FIG. 1. In embodiments according to FIG. 8, policy threshold fine tuning can be used to for real time adaptation of a URLLC RSSI threshold (R'=R1) based on measured QoS KPIs and target performance requirements such as delay and/or packet loss which may be specified in a 5QI profile.

At 801, the process can begin by collecting URLLC QOS KPIs, i.e. performance measurements 151, such as measurements of delay and/or packet loss. At 802, the process can determine whether the performance measurements 151 such as delay and/or packet loss violate delay and/or packet loss thresholds specified in the dynamic policy 112. If yes at 802, then at 803 the process can modify a dynamic policy 112 threshold, e.g., by decreasing a threshold R1, and therefore tolerating less interference. If no at 802, then the process can return to 801.

The techniques illustrated in FIGS. 6, 7, and 8 use interference RSSI as an example performance measurement, however the embodiments can be generalized by replacing or augmenting interference RSSI with UE channel measurements such as CQI, in order to satisfy a QoS level for UEs at a cell edge (i.e., with low CQI).

Figure 9:
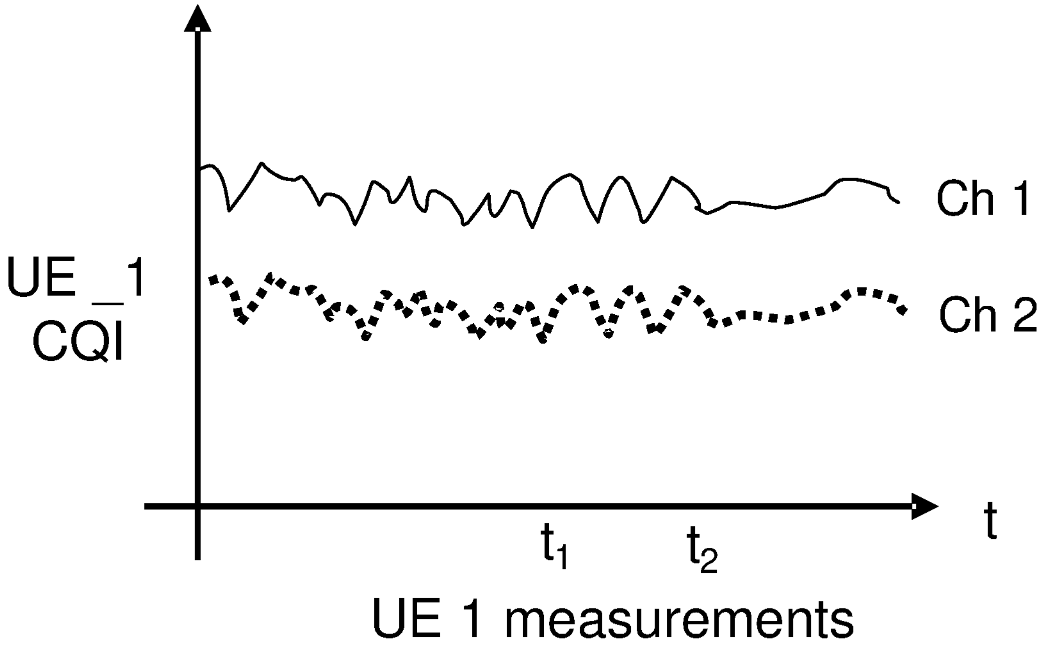
FIG. 9 illustrates example channel quality indicator (CQI) measurements of two different channels as measured at a first user equipment, in accordance with one or more embodiments described herein.
Figure 10:
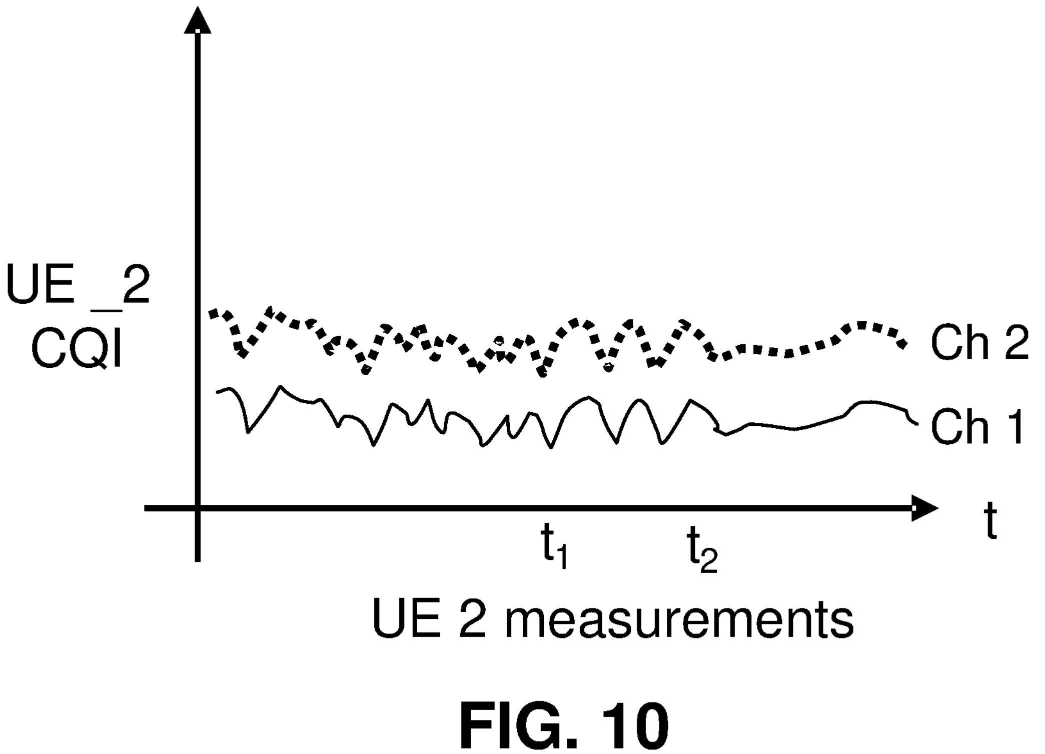
FIG. 10 illustrates example CQI measurements of the two different channels as measured at a second user equipment, in accordance with one or more embodiments described herein.

FIG. 9 illustrates example channel quality indicator (CQI) measurements of two different channels as measured at a first user equipment, and FIG. 10 illustrates example CQI measurements of the two different channels as measured at a second user equipment, in accordance with one or more embodiments described herein.

Some embodiments of this disclosure can be extended by performing UE aware CBRS channel selection. For example, RSSI measurements can be replaced or augmented by UE channel measurements such as CQI in order to satisfy the QoS level for UEs at a cell edge (i.e., with low CQI). As illustrated in FIG. 9 and FIG. 10, UE 1 reported a higher CQI (better channel) for channel 1, while UE 2 reported a low CQI for channel 1. UE 2 may be for example a cell edge user suffering from neighbor cell interference.

Embodiments of this disclosure can check the priority of both UEs, and if the priority of UE 2 is higher than that of UE 1, then channel 2 (preferred for UE 2) can be recommended.

For UE aware channel selection, a dynamic policy 112 can contain different CQI value thresholds for different UEs. UEs can be associated with minimum CQI thresholds based on the UE QoS level. Alternatively, a dynamic policy 112 can contain apply a weighted average of UEs CQI, where the weights are proportional to the UE priority. The UE priority can be derived from information specified in UE 5QI configurations. An example formula for applying a weighted average is set forth below:

$$\text{Selected channel } x=\text{argmax}(F_x=\Sigma_{j\forall UES}w_j{*}CQIj)$$

Figure 11:
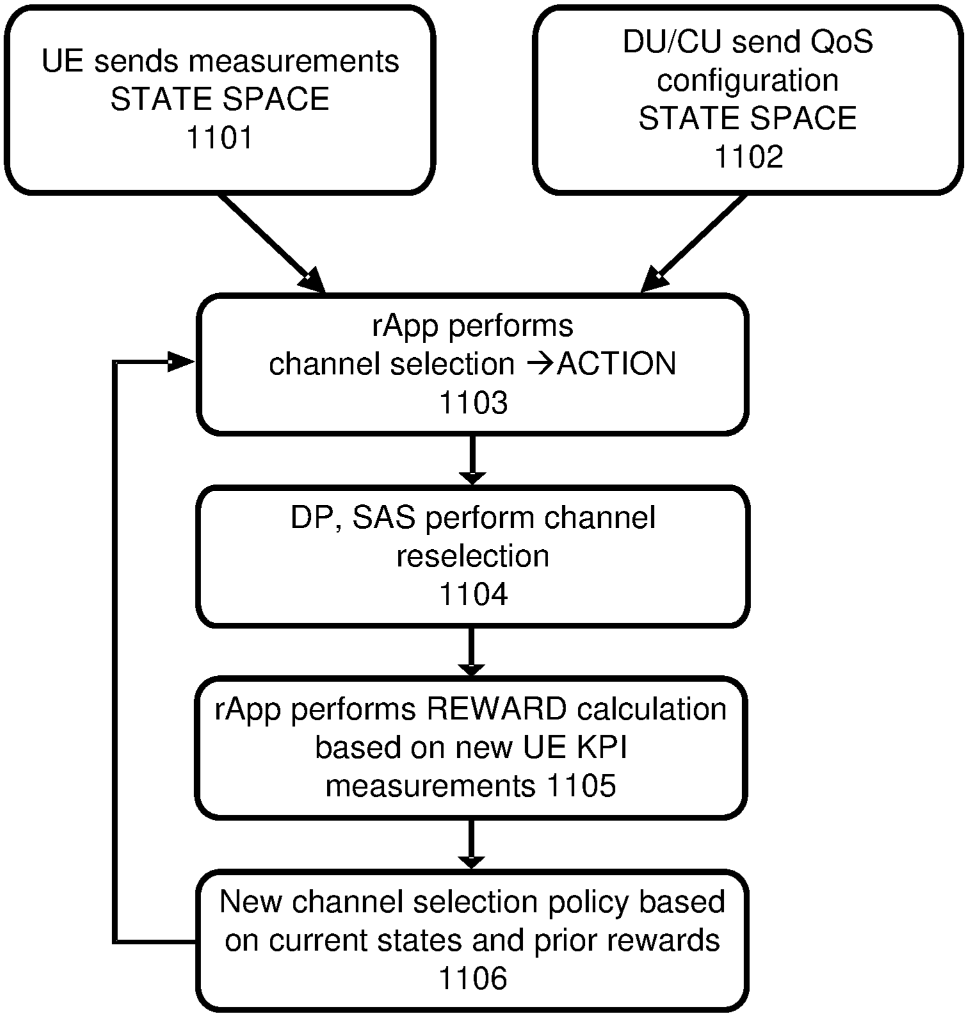
FIG. 11 illustrates example operations performed in connection with artificial intelligence or machine learning based policy optimization, in accordance with one or more embodiments described herein.

FIG. 11 illustrates example operations performed in connection with artificial intelligence or machine learning based policy optimization, in accordance with one or more embodiments described herein. The illustrated operations can be performed for example by an rApp 212 such as illustrated in FIG. 2. Instead of simple threshold-based decision making as described in connection with FIGS. 6, 7, and 8, an artificial intelligence (AI) engine can allow policy optimizations based on prior history and actions taken by the agent (rApp 212).

An AI/ML based engine within the rApp 212 can be utilized for dynamic policy adaptations based on KPIs such as 5QI, latency, and throughput, as well as based on configurations and UE/RU measurement reports. The AI/ML based engine can be configured to find a solution for a multi-objective optimization problem which is NP-hard and which encompasses KPI maximization of UEs from each class (eMBB, URLLC) while maintaining QoS constraints through efficient channel selection. An example solution is represented by the below formula:

$$\max\Sigma_{l\in L}\Sigma_{i\in I}w_l KPI_{i,l}$$

Solutions can also be subject to the below example QoS constraint:

$$QoS_{i,l}\geq QoS_{th,l};\ \forall i\in UE,\ l\in L$$

where $KPI_{i,l}$, $QoS_{i,l}$ are the normalized KPIs (e.g., functions of throughput or latency) for the $i^{th}$ UE for the 1th device class type (eMBB, URLLC). $QoS_{th,l}$ is the QoS threshold for the 1th device class. $w_l$ is the priority weight of the device class type. A URLLC device type can be given a higher priority compared to other eMBB types. The QoS threshold $QoS_{th,l}$ can be defined by the operator and used as part of the policy in the rApp 212.

Learning models an AI/ML based engine within the rApp 212 can include supervised learning and/or reinforcement learning. In a supervised learning approach, a multi-class classification problem per cell can be based on the available data which includes the training data parameters that include channel quality measurements, load profile, RSSI measurements and the label for the best channel. However, due to the dynamicity of the channel and environment, offline learning from supervised learning, particularly with a larger number of available channels may not be feasible. In that case, a reinforcement learning approach can be used in which the model rewards rApp agents for better selection of channels in real time.

In an example reinforcement learning approach, an rApp 212 instance per cell can use local UE KPI data and configuration information to formulate channel selection policies. Local model training can be enhanced through federation, which involves model aggregation and then local model weights, and parameters can be updated in non-real-time scale to improve performance.

State information for use by a reinforcement learning model can be retrieved from UE measurements and CU/DU QOS configurations. The state information can include, e.g., RSSI measurements, load per channel, 5QI measurements, KPI measurements (throughput, latency) per UE (i.e., $KPI_{i,l}$), and/or traffic patterns such as mobility, data usage, and device distribution.

Actions assigned by a reinforcement learning model can include channel assignment vectors showing a binary (YES/NO) for each channel. Rewards assigned by a reinforcement learning model can be a function of the UE utility per class, with defined prioritization and shaping functions for faster convergence. A penalty (lower/negative reward) can be applied for actions resulting in QoS violations, particularly of high priority UE device classes (i.e., $QoS_{i,l} < QoS_{th,l}$).

FIG. 11 includes, at 1101, a UE sends measurements for a state space, and at 1102, a DU/CU send QoS configuration, also for the state space. At 1103, the rApp 212 can perform channel selection as an action. At 1104, the DP 213 and SAS 220 can perform channel reselection. At 1105, the rApp 212 performs a reward calculation based on new UE KPI measurements. At 1106, a new channel selection policy can be applied, based on current states and prior rewards.

Figure 12:
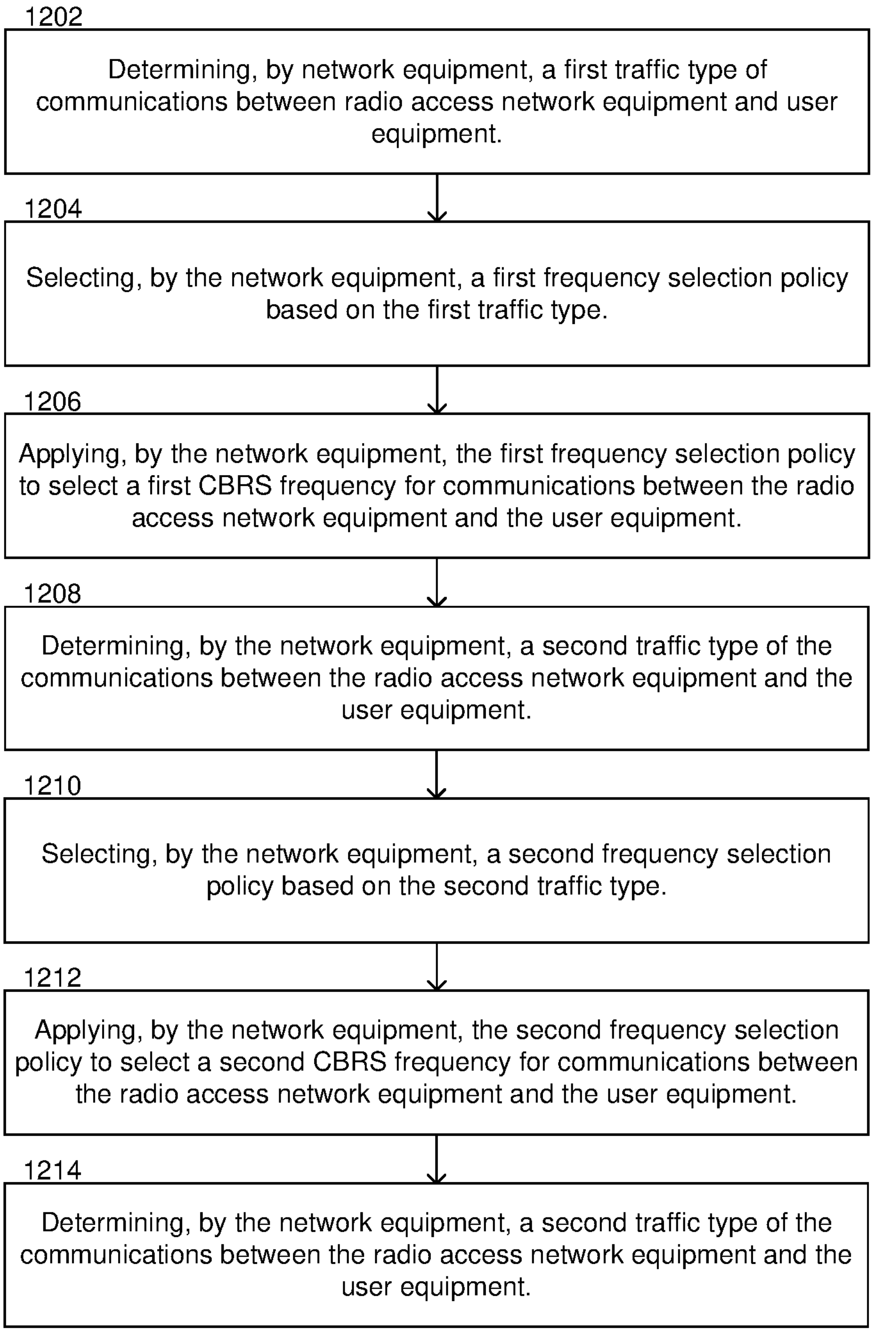
FIG. 12 is a flow diagram of an example, non-limiting computer implemented method to apply a frequency selection policy to select a CBRS frequency for communications between radio access network equipment and a user equipment, in accordance with one or more embodiments described herein.

FIG. 12 is a flow diagram of an example, non-limiting computer implemented method to apply a frequency selection policy to select a CBRS frequency for communications between radio access network equipment and a user equipment, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 12 can be performed by network equipment such as the controller 111 illustrated in FIG. 1 or the SMO 210 illustrated in FIG. 2. Operation 1202 comprises determining, by network equipment 111, a first traffic type of communications between radio access network equipment such as network node 131 and user equipment 132, 133. The first traffic type can comprise for example an eMBB traffic type, a URLLC traffic type, or any other traffic type. In some embodiments, the first traffic type can comprise a mix of traffic types, e.g., a predetermined proportion of URLLC traffic and another predetermined portion of eMBB traffic.

Operation 1204 comprises selecting, by the network equipment 111, a first frequency selection policy based on the first traffic type. For example, a first version of the dynamic policy 112 can be selected.

Operation 1206 comprises applying, by the network equipment 1206, the first frequency selection policy 112 to select a first CBRS frequency for communications between the radio access network equipment 111 and the user equipment 132, 133. Applying the first frequency selection policy 112 can comprise, for example, comparing, by the network equipment 111, different performance indicator measurement values 151 with a performance indicator threshold of the frequency selection policy 112, wherein the different performance indicator measurement values 151 are associated with different CBRS frequencies. The performance indicator threshold can comprise, e.g., an interference threshold, an interference RSSI threshold, a CQI threshold, or any other network KPI. In some embodiments, more complex performance indicator thresholds can be used such as averages of maximum/minimum values of a performance indicator over a period of time, or weighted combinations of different performance indicator measurements. In some embodiments, the performance indicator threshold can comprise, e.g., a first threshold for an average value of a performance indicator, a second threshold for a maximum value of the performance indicator, or a third threshold for a time duration at which the performance indicator is able to remain above a threshold value.

Applying the first frequency selection policy 112 can further comprise, in response to the CBRS frequency satisfying the performance indicator threshold, selecting, by the network equipment 111, the CBRS frequency for the communications between the radio access network equipment 131 and user equipment 132, 133.

Operation 1208 comprises determining, by the network equipment 111, a second traffic type of the communications between the radio access network equipment 131 and the user equipment 132, 133. As with operation 1202, the second traffic type can comprise an eMBB traffic type, a URLLC traffic type, or other traffic types. In an example, the second traffic type can be different from the first traffic type such that the second traffic type is better served by a different CBRS frequency.

Operation 1210 comprises selecting, by the network equipment 111, a second frequency selection policy, e.g., a second version of the dynamic policy 112, based on the second traffic type. Operation 1212 comprises applying, by network equipment 111, the second frequency selection policy 112 to select a second CBRS frequency for the communications between the radio access network equipment 131 and the user equipment 132, 133. Applying the second frequency selection policy 112 can be similar to applying the first frequency selection policy 112. New performance indicator measurement values 151 can be gathered and compared to a different performance indicator threshold used by the second frequency selection policy 112.

Figure 13:
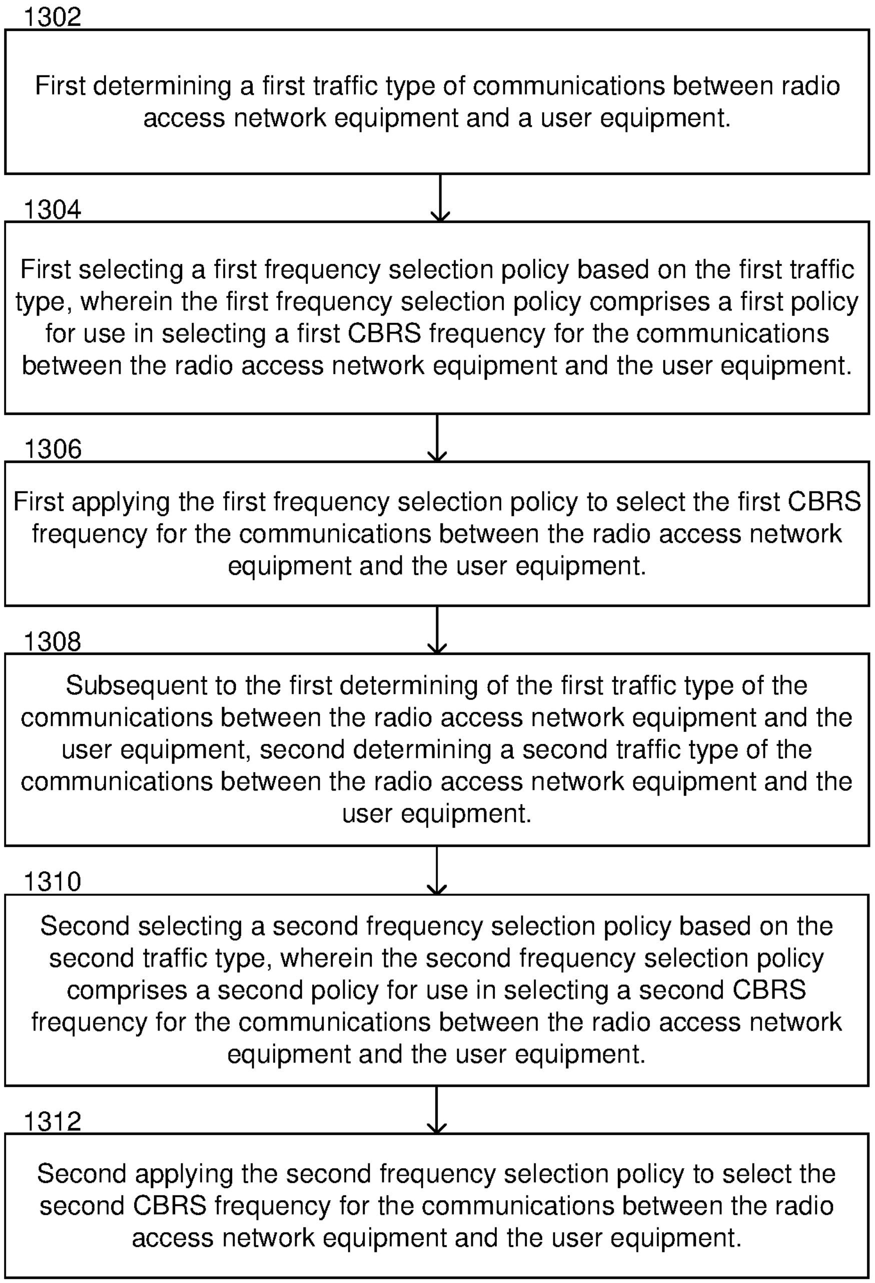
FIG. 13 is a flow diagram of an example, non-limiting computer implemented method to apply a dynamic frequency selection policy to select a CBRS frequency for communications between radio access network equipment and a user equipment, in accordance with one or more embodiments described herein.

FIG. 13 is a flow diagram of an example, non-limiting computer implemented method to apply a dynamic frequency selection policy to select a CBRS frequency for communications between radio access network equipment and a user equipment, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 13 can be performed by network equipment such as the controller 111 illustrated in FIG. 1 or the SMO 210 illustrated in FIG. 2. Operation 1302 comprises first determining a first traffic type of communications between radio access network equipment 131 and a user equipment 132. The first traffic type can comprise, e.g., an eMBB traffic type or a URLLC traffic type, or any number of different hybrid traffic types.

Operation 1304 comprises first selecting a first frequency selection policy 112 based on the first traffic type, wherein the first frequency selection policy 112 comprises a first policy for use in selecting a first CBRS frequency for the communications between the radio access network equipment 131 and the user equipment 132.

Operation 1306 comprises first applying the first frequency selection policy 112 to select the first CBRS frequency for the communications between the radio access network equipment 131 and the user equipment 132. The first applying of the first frequency selection policy 112 can comprise first comparing first different performance indicator measurement values 151 with a first performance indicator threshold of the first frequency selection policy 112, wherein the first different performance indicator measurement values 151 are associated with different CBRS frequencies. The first performance indicator threshold can comprise, e.g., an interference threshold, an interference RSSI threshold, a CQI threshold, or for example a function of at least one of a first threshold for an average value of a first performance indicator, a second threshold for a maximum value of the first performance indicator, or a third threshold for a time duration at which the first performance indicator is able to remain above a threshold value.

The first applying of the first frequency selection policy 112 can further comprise first selecting the first CBRS frequency for the communications between the radio access network equipment 131 and user equipment 132, wherein first selecting the first CBRS frequency is in response to the first CBRS frequency satisfying the first performance indicator threshold.

Operation 1308 comprises, subsequent to the first determining of the first traffic type of the communications between the radio access network equipment 131 and the user equipment 132, second determining a second traffic type of the communications between the radio access network equipment 131 and the user equipment 132. The second traffic type can comprise an eMBB traffic type or a URLLC traffic type, or a hybrid type. The second traffic type can for example be different from the first traffic type, thereby warranting a change in the CBRS channel selection policy 112.

Operation 1310 comprises second selecting a second frequency selection policy 112 based on the second traffic type, wherein the second frequency selection policy 112 comprises a second policy for use in selecting a second CBRS frequency for the communications between the radio access network equipment 131 and the user equipment 132.

Operation 1312 comprises second applying the second frequency selection policy 112 to select the second CBRS frequency for the communications between the radio access network equipment 131 and the user equipment 132. Similar to applying the first dynamic policy 112, the second applying of the second frequency selection policy 112 can comprise second comparing second different performance indicator measurement values 151 with a second performance indicator threshold of the second frequency selection policy 112, wherein the second different performance indicator measurement values 151 are associated with the different CBRS frequencies. After comparing the second different performance indicator measurement values 151 with the second performance indicator threshold, operation 1312 can second select the second CBRS frequency for the communications between the radio access network equipment 131 and user equipment 132, in response to the second CBRS frequency satisfying the second performance indicator threshold.

Figure 14:
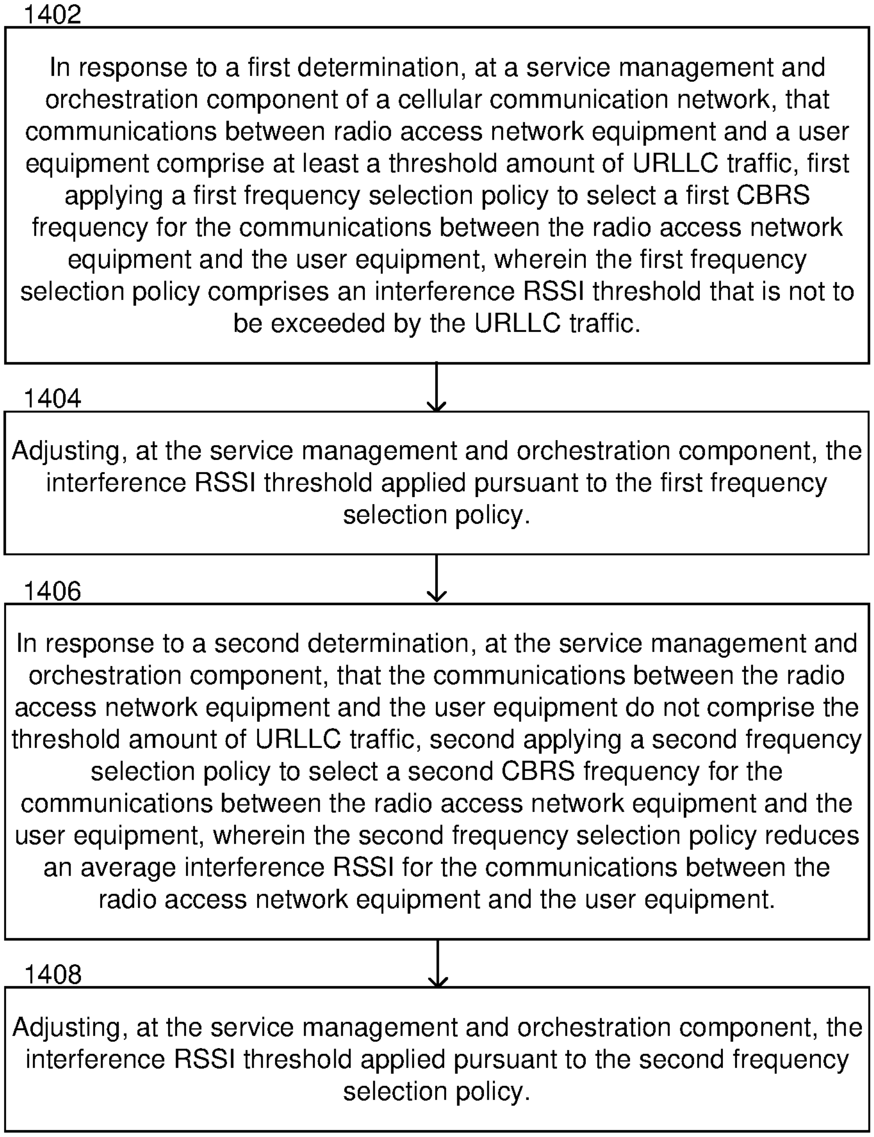
FIG. 14 is a flow diagram of an example, non-limiting computer implemented method to apply a dynamic frequency selection policy based on network traffic type to select a CBRS frequency for communications between radio access network equipment and a user equipment, in accordance with one or more embodiments described herein.

FIG. 14 is a flow diagram of an example, non-limiting computer implemented method to apply a dynamic frequency selection policy based on network traffic type to select a CBRS frequency for communications between radio access network equipment and a user equipment, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 9 can be performed by network equipment such as the controller 111 illustrated in FIG. 1 or the SMO 210 comprising the near real-time radio intelligent controller 211 illustrated in FIG. 2. Operation 1402 comprises, in response to a first determination, at a service management and orchestration component 210 of a cellular communication network, that communications between radio access network equipment such as RU 233 and a user equipment 241 comprise at least a threshold amount of URLLC traffic, first applying a first frequency selection policy to select a CBRS frequency for the communications between the radio access network equipment 233 and the user equipment 241, wherein the first frequency selection policy comprises an interference RSSI threshold that is not to be exceeded by the URLLC traffic.

In some embodiments, the first frequency selection policy can optionally further comprise additional performance thresholds, e.g., at least one other performance indicator threshold, other than the interference RSSI threshold. The first frequency selection policy can also optionally comprise relative weights applicable to the interference RSSI threshold and the at least one other performance indicator threshold.

Operation 1404 comprises adjusting, at the service management and orchestration component 210, the interference RSSI threshold applied pursuant to the first frequency selection policy. Rather than changing the policy to a new policy, the thresholds of a policy can be adjusted, and the policy can remain in use.

Operation 1406 comprises, in response to a second determination, at the service management and orchestration component 210, that the communications between the radio access network equipment 233 and the user equipment 241 do not comprise the threshold amount of URLLC traffic, second applying a second frequency selection policy to select a second CBRS frequency for the communications between the radio access network equipment 233 and the user equipment 241, wherein the second frequency selection policy reduces an average interference RSSI for the communications between the radio access network equipment 233 and the user equipment 241. In another embodiments, the second frequency selection policy can instead increase the average interference RSSI for the communications between the radio access network equipment 233 and the user equipment 241.

Operation 1408 comprises adjusting, at the service management and orchestration component 210, the interference RSSI threshold applied pursuant to the second frequency selection policy. As noted above, rather than changing the policy to a new policy, the thresholds of a policy can be adjusted, and the policy can remain in use.

Figure 15:
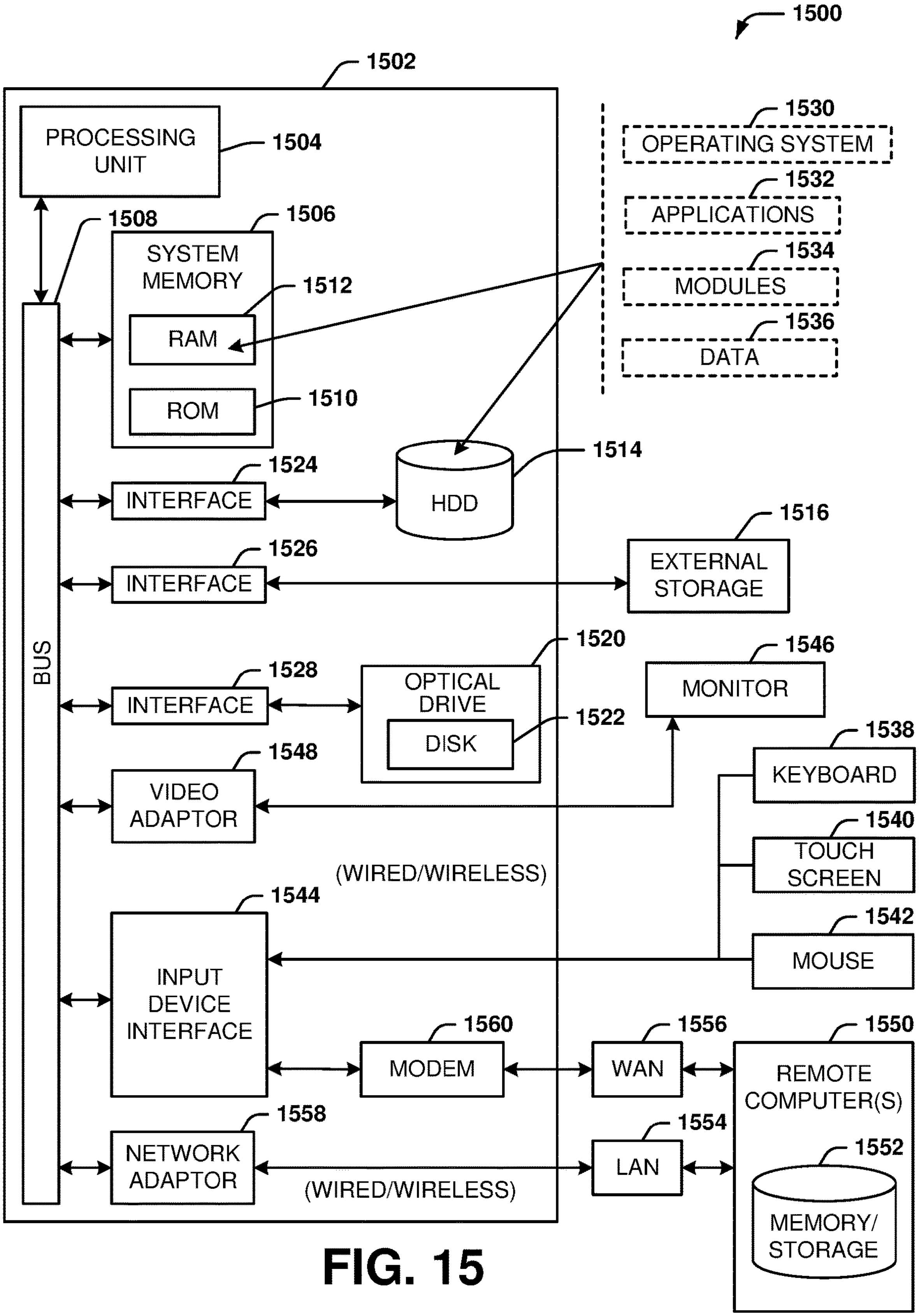
FIG. 15 illustrates a block diagram of an example computer operable to provide any of the various devices described herein.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors and may include a cache memory. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid-state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can comprise a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

applying, by network equipment comprising at least one processor, a frequency selection policy to select a citizens broadband radio service (CBRS) frequency for communications between radio access network equipment and a user equipment, wherein the applying of the frequency selection policy comprises:

comparing different performance indicator measurement values with a performance indicator threshold of the frequency selection policy, wherein the different performance indicator measurement values are associated with different CBRS frequencies; and in response to a first CBRS frequency of the different CBRS frequencies being determined to satisfy the performance indicator threshold, selecting the first CBRS frequency for the communications between the radio access network equipment and the user equipment;

based on a detected change to the different performance indicator measurement values, modifying, by the network equipment, the frequency selection policy, resulting in an updated frequency selection policy; and based on the updated frequency selection policy, selecting, by the network equipment, a second CBRS frequency for the communications between the radio access network equipment and the user equipment.

2. The method of claim 1, wherein the network equipment comprises a service management and orchestration component.

3. The method of claim 1, further comprising:

determining, by the network equipment, a traffic type of the communications between the radio access network equipment and the user equipment; and selecting, by the network equipment, the frequency selection policy based on the traffic type.

4. The method of claim 3, wherein the traffic type is a first traffic type and the frequency selection policy is a first frequency selection policy, and wherein the method further comprises:

determining, by the network equipment, a second traffic type of the communications between the radio access network equipment and the user equipment;

selecting, by the network equipment, a second frequency selection policy based on the second traffic type; and applying, by the network equipment, the second frequency selection policy to select the second CBRS frequency for the communications between the radio access network equipment and the user equipment.

5. The method of claim 4, wherein the first traffic type comprises an enhanced mobile broadband traffic type, and wherein the second traffic type comprises an ultra-reliable low latency communications traffic type.

6. The method of claim 1, wherein the performance indicator threshold comprises an interference threshold.

7. The method of claim 1, wherein the performance indicator threshold comprises an interference received signal strength indicator threshold.

8. The method of claim 1, wherein the performance indicator threshold comprises a first threshold for an average value of a performance indicator, a second threshold for a maximum value of the performance indicator, or a third threshold for a time duration at which the performance indicator is able to remain above a threshold value.

9. A system, comprising:

at least one processor; and at least one memory that stores executable instructions that, when executed by the at least one processor, facilitate performance of operations, comprising:

based on a frequency selection policy, selecting a citizens broadband radio service (CBRS) frequency for communications between radio access network equipment and a user equipment, wherein the selecting of the CBRS frequency comprises:

comparing different performance indicator measurement values associated with different CBRS frequencies with a performance indicator threshold of the frequency selection policy; and based on a first CBRS frequency of the different CBRS frequencies being determined to satisfy the performance indicator threshold, selecting the first CBRS frequency for the communications between the radio access network equipment and the user equipment;

based on a determination that the different performance indicator measurement values have changed, modifying the frequency selection policy, resulting in an updated frequency selection policy; and based on the updated frequency selection policy, selecting a second CBRS frequency for the communications between the radio access network equipment and the user equipment.

10. The system of claim 9, wherein the operations further comprise:

determining a traffic type of the communications between the radio access network equipment and the user equipment; and selecting the frequency selection policy based on the traffic type.

11. The system of claim 10, wherein the traffic type is a first traffic type and the frequency selection policy is a first frequency selection policy, and wherein the operations further comprise:

determining a second traffic type of the communications between the radio access network equipment and the user equipment;

selecting a second frequency selection policy based on the second traffic type; and applying the second frequency selection policy to select the second CBRS frequency for the communications between the radio access network equipment and the user equipment.

12. The system of claim 11, wherein the first traffic type comprises an enhanced mobile broadband traffic type, and wherein the second traffic type comprises an ultra-reliable low latency communications traffic type.

13. The system of claim 9, wherein the performance indicator threshold comprises an interference threshold.

14. The system of claim 9, wherein the performance indicator threshold comprises an interference received signal strength indicator threshold.

15. The system of claim 9, wherein the performance indicator threshold comprises a first threshold for an average value of a performance indicator, a second threshold for a maximum value of the performance indicator, or a third threshold for a time duration at which the performance indicator is able to remain above a threshold value.

16. The system of claim 9, wherein the different performance indicator measurement values are measurements performed by the radio access network equipment on the different CBRS frequencies.

17. The system of claim 9, wherein the different performance indicator measurement values are measurements performed by the user equipment on the different CBRS frequencies.

18. The system of claim 9, wherein the applying further comprises:

avoiding a selection of CBRS frequencies of the different CBRS frequencies that fail to satisfy the performance indicator threshold.

19. A non-transitory machine-readable medium, comprising executable instructions that, when executed by at least one processor of network equipment, facilitate performance of operations, comprising:

comparing different performance indicator measurement values with a performance indicator threshold of a frequency selection policy for selection of a citizens broadband radio service (CBRS) frequency for communications between radio access network equipment and a user equipment, wherein the different performance indicator measurement values are associated with different CBRS frequencies;

in response to a first CBRS frequency of the different CBRS frequencies being determined to satisfy the performance indicator threshold, selecting the first CBRS frequency for the communications between the radio access network equipment and the user equipment;

based on a detected change to the different performance indicator measurement values, modifying the frequency selection policy, resulting in an updated frequency selection policy; and based on the updated frequency selection policy, selecting a second CBRS frequency for the communications between the radio access network equipment and the user equipment.

20. The non-transitory machine-readable medium of claim 19, wherein the performance indicator threshold comprises a first threshold for an average value of a performance indicator, a second threshold for a maximum value of the performance indicator, or a third threshold for a time duration at which the performance indicator is able to remain above a threshold value.

* * * * *